United States Patent
Mure et al.

(10) Patent No.: US 12,049,527 B2
(45) Date of Patent: Jul. 30, 2024

(54) BIMODAL POLYETHYLENE COPOLYMER COMPOSITION AND PIPE MADE THEREOF

(71) Applicant: Univation Technologies, LLC, Houston, TX (US)

(72) Inventors: Cliff R. Mure, Bound Brook, NJ (US); Timothy R. Lynn, Glen Gardner, NJ (US); Roger L Kuhlman, Lake Jackson, TX (US); John F. Szul, Hurricane, WV (US); Angela I. Padilla-Acevedo, Lake Jackson, TX (US)

(73) Assignee: UNIVATION TECHNOLOGIES, LLC, Houston, TX (US)

( * ) Notice: Subject to any disclaimer, the term of this patent is extended or adjusted under 35 U.S.C. 154(b) by 764 days.

(21) Appl. No.: 17/276,912

(22) PCT Filed: Sep. 10, 2019

(86) PCT No.: PCT/US2019/050362
§ 371 (c)(1),
(2) Date: Mar. 17, 2021

(87) PCT Pub. No.: WO2020/068413
PCT Pub. Date: Apr. 2, 2020

(65) Prior Publication Data
US 2021/0380737 A1  Dec. 9, 2021

Related U.S. Application Data

(60) Provisional application No. 62/737,965, filed on Sep. 28, 2018.

(51) Int. Cl.
| | | |
|---|---|---|
| *C08F 210/16* | (2006.01) | |
| *C08F 4/659* | (2006.01) | |
| *F16L 9/12* | (2006.01) | |
| *B29C 48/00* | (2019.01) | |
| *B29C 48/09* | (2019.01) | |
| *B29K 23/00* | (2006.01) | |
| *B29K 105/00* | (2006.01) | |
| *B29L 23/00* | (2006.01) | |

(52) U.S. Cl.
CPC ........ *C08F 210/16* (2013.01); *C08F 4/65912* (2013.01); *C08F 4/65916* (2013.01); *F16L 9/12* (2013.01); *B29C 48/0019* (2019.02); *B29C 48/09* (2019.02); *B29K 2023/08* (2013.01); *B29K 2105/0085* (2013.01); *B29L 2023/22* (2013.01); *C08F 2800/10* (2013.01)

(58) Field of Classification Search
CPC .................. C08F 210/14; C08F 210/16; C08F 4/659–65927; C08F 2500/05
USPC ............................................. 428/34.1–36.92
See application file for complete search history.

(56) References Cited

U.S. PATENT DOCUMENTS

| | | | |
|---|---|---|---|
| 3,709,853 A | 1/1973 | Karapinka | |
| 4,003,712 A | 1/1977 | Miller | |
| 4,011,382 A | 3/1977 | Levine et al. | |
| 4,302,566 A | 11/1981 | Karol et al. | |
| 4,453,399 A | 6/1984 | Thompson | |
| 4,543,399 A | 9/1985 | Jenkins, III et al. | |
| 4,588,790 A | 5/1986 | Jenkins, III et al. | |
| 4,882,400 A | 11/1989 | Dumain et al. | |
| 4,988,783 A | 1/1991 | Beran et al. | |
| 4,994,534 A | 2/1991 | Rhee et al. | |
| 5,332,706 A | 7/1994 | Nowlin et al. | |
| 5,338,589 A * | 8/1994 | Bohm .................. | C08L 23/06 |
| | | | 525/88 |
| 5,352,749 A | 10/1994 | DeChellis et al. | |
| 5,462,999 A | 10/1995 | Griffin et al. | |
| 5,541,270 A | 7/1996 | Chinh et al. | |
| 5,582,923 A * | 12/1996 | Kale .................... | C08F 10/00 |
| | | | 264/171.23 |
| 5,627,242 A | 5/1997 | Jacobsen et al. | |
| 5,665,818 A | 9/1997 | Tilston et al. | |
| 5,677,375 A | 10/1997 | Rifi et al. | |

(Continued)

FOREIGN PATENT DOCUMENTS

| | | |
|---|---|---|
| EP | 0634421 | 1/1995 |
| EP | 0649992 | 4/1995 |

(Continued)

OTHER PUBLICATIONS

Basov, "Quality control for polymer materials [in Russian]", 2nd edition, 1990, p. 112.
Office Action from corresponding Russian Application No. 2021 111 625 dated Aug. 4, 2023.
BASF, Dehyton® PL, Material Safety Data Sheet, 2016, p. 1-10.
PCT/US2019/050362, International Search Report and Written Opinion with a mailing date of Jan. 22, 2020.
PCT/US2019/050362, International Preliminary Report on Patentability with a mailing date of Mar. 23, 2021.
Havermans, "An elegant and fast method to predict the slow crack growth behavior of HDPE pipe material", 3R International (49) Heft, 2010, pp. 548-551.

(Continued)

*Primary Examiner* — Michael C Romanowski

(57) ABSTRACT

A bimodal ethylene-co-1-hexene copolymer composition consisting of a higher molecular weight component and a lower molecular weight component and, when in melted form at 190 degrees Celsius, is characterized by a melt property performance defined by a combination of melt index (5 kg), melt strength, and, optionally, shear thinning properties, and, when in solid form, is characterized by a slow crack growth property performance defined by a combination of strain hardening modulus and accelerated full-notch creep test performance. A pipe consisting of the bimodal ethylene-co-1-hexene copolymer composition. A method of synthesizing the bimodal ethylene-co-1-hexene copolymer composition. A method of making the pipe. A manufactured article, which is not a pipe, comprising the bimodal ethylene-co-1-hexene copolymer composition.

9 Claims, No Drawings

(56) References Cited

U.S. PATENT DOCUMENTS

| | | | |
|---|---|---|---|
| 5,882,750 A * | 3/1999 | Mink | C08F 10/02 525/240 |
| 6,489,408 B2 | 12/2002 | Mawson et al. | |
| 6,534,604 B2 | 3/2003 | Loveday et al. | |
| 6,545,093 B1 * | 4/2003 | de Lange | C08L 23/0815 525/240 |
| 6,878,784 B1 * | 4/2005 | Asumalahti | C08L 23/0815 526/348.4 |
| 6,989,344 B2 | 1/2006 | Cann et al. | |
| 7,037,977 B2 | 5/2006 | Miserque et al. | |
| 7,078,467 B1 | 7/2006 | Kolb et al. | |
| 7,090,927 B2 | 8/2006 | Shannon et al. | |
| 7,157,531 B2 | 1/2007 | Szul et al. | |
| 7,223,825 B2 | 5/2007 | Kolb et al. | |
| 7,300,988 B2 | 11/2007 | Kolb et al. | |
| 7,989,549 B2 | 8/2011 | Zhou et al. | |
| 8,227,552 B2 * | 7/2012 | Kolb | C08F 10/02 526/348 |
| 8,378,029 B2 | 2/2013 | Liu et al. | |
| 8,497,329 B2 | 7/2013 | Kolb et al. | |
| 8,642,710 B2 | 2/2014 | Damme et al. | |
| 9,051,458 B2 | 6/2015 | Berthold et al. | |
| 9,079,993 B1 * | 7/2015 | St. Jean | B01J 19/2455 |
| 9,175,111 B2 | 11/2015 | Kapur et al. | |
| 9,273,170 B2 | 3/2016 | Hlavinka et al. | |
| 9,493,589 B1 | 11/2016 | Greco et al. | |
| 2004/0005424 A1 * | 1/2004 | Krumpel | C08L 23/0815 428/36.9 |
| 2006/0041073 A1 * | 2/2006 | Zhou | C08F 210/16 525/240 |
| 2010/0317798 A1 * | 12/2010 | VanDun | C08L 23/0807 525/240 |
| 2011/0034635 A1 * | 2/2011 | Kapur | C08F 10/00 525/240 |
| 2011/0118417 A1 * | 5/2011 | Liu | C08F 10/00 525/240 |
| 2012/0141710 A1 * | 6/2012 | Yang | C08F 210/16 526/348 |
| 2014/0107308 A1 * | 4/2014 | Yang | C08F 210/16 526/348.5 |
| 2015/0274947 A1 * | 10/2015 | Vittorias | F16L 9/12 525/53 |
| 2016/0032027 A1 * | 2/2016 | St. Jean | C08L 23/0815 526/348.5 |
| 2016/0068623 A1 | 3/2016 | Kapur et al. | |
| 2016/0297907 A1 | 10/2016 | Goode et al. | |
| 2017/0129977 A1 * | 5/2017 | Martin | C08F 210/16 |
| 2017/0137551 A1 * | 5/2017 | Pequeno | B29C 49/0005 |
| 2017/0369612 A1 * | 12/2017 | Dreng | C08L 23/0815 |
| 2018/0208749 A1 * | 7/2018 | Garg | C08L 23/0815 |
| 2018/0237621 A1 * | 8/2018 | Vittorias | B32B 27/08 |
| 2018/0298128 A1 * | 10/2018 | Harlan | C08F 210/16 |
| 2019/0248991 A1 * | 8/2019 | Suchao-In | C08L 23/06 |
| 2019/0359741 A1 * | 11/2019 | Suchao-In | C08L 23/04 |
| 2019/0359802 A1 * | 11/2019 | Suchao-In | C08L 23/06 |
| 2020/0062883 A1 * | 2/2020 | Roos | C08F 297/086 |

FOREIGN PATENT DOCUMENTS

| | | | |
|---|---|---|---|
| EP | 0794200 | 9/1997 | |
| EP | 0802202 | 10/1997 | |
| EP | 1460105 | 9/2004 | |
| EP | 1460105 A1 * | 9/2004 | C08L 23/04 |
| EP | 1985660 | 10/2008 | |
| EP | 2285896 | 9/2016 | |
| EP | 3293208 | 3/2018 | |
| EP | 3155026 | 6/2023 | |
| TH | 1801003211 | 3/2019 | |
| WO | 2016102513 | 6/2016 | |
| WO | 2016/168700 | 10/2016 | |
| WO | 2016188703 | 12/2016 | |
| WO | 2017009058 | 1/2017 | |
| WO | 2017093008 | 6/2017 | |
| WO | 2017/132092 | 8/2017 | |
| WO | WO-2017132092 A1 * | 8/2017 | C08F 210/16 |
| WO | 2018046668 | 3/2018 | |
| WO | 2018089194 | 5/2018 | |
| WO | 2018095772 | 5/2018 | |
| WO | 2018147968 | 8/2018 | |

OTHER PUBLICATIONS

Cheng, "Mechanical and chemical properties of high density polyethylene: Effect of microstructure on creep characteristic", 2008.

Tsou, "Processability-enhanced bimodal high-density polyethylene with comb-branched high density polyethylene", Journal of Applied Polymer Science, 2018.

Shi, "Effect of low molecular weight ethylene homopolymer on structure and properties of bimodal high density polyethylene", Applied Mechanics and Materials, 2012, vols. 217-219, pp. 603-608.

"PE pipe and fitting manufacturing", ch. 4, pp. 105-123.

Office Action from corresponding Thai Application No. 2101001458 dated Sep. 26, 2023.

* cited by examiner

BIMODAL POLYETHYLENE COPOLYMER COMPOSITION AND PIPE MADE THEREOF

FIELD

Polyethylene copolymer compositions, pipes, and related methods.

INTRODUCTION

Patent application publications and patents in or about the field include US 2016/0068623 A1; US 2016/0297907 A1; WO 2016/188703 A1; WO 2017/009058 A1; WO 2017/093008 A1; WO 2017/132092 A1; EP2285896B1'; EP2285896B1; U.S. Pat. Nos. 5,332,706; 5,882,750; 6,989,344 B2; U.S. Pat. No. 7,078,467 B1; U.S. Pat. No. 7,090,927 B2; U.S. Pat. No. 7,157,531 B2; U.S. Pat. No. 7,223,825 B2; U.S. Pat. No. 7,300,988 B2; U.S. Pat. No. 8,227,552 B2; U.S. Pat. No. 8,497,329 B2; and U.S. Pat. No. 9,051,458 B2.

SUMMARY

A bimodal ethylene-co-1-hexene copolymer composition consisting essentially of a higher molecular weight (HMW) component and a lower molecular weight (LMW) component and, when in melted form at 190 degrees Celsius (° C.), is characterized by a melt property performance defined by a combination of melt flow index (5 kg), melt strength, and, optionally, shear thinning properties, and, when in solid form, is characterized by a slow crack growth property performance defined by a combination of strain hardening modulus and accelerated full-notch creep test (FNCT) performance ("the bimodal ethylene-co-1-hexene copolymer composition"). With "consisting essentially of", the bimodal ethylene-co-1-hexene copolymer composition is free of a distinct third or more component as determined by gel permeation chromatography (GPC) measured according to the GPC Test Method. For example, the bimodal ethylene-co-1-hexene copolymer composition is not trimodal or tetramodal.

A method of synthesizing the bimodal ethylene-co-1-hexene copolymer composition, the method consisting essentially of polymerizing ethylene (monomer) and 1-hexene (comonomer) with a single bimodal catalyst system in a single fluidized-bed, gas phase polymerization (FB-GPP) reactor under effective operating conditions, thereby making the bimodal ethylene-co-1-hexene copolymer composition. With "consisting essentially of", the method is free of Ziegler-Natta catalysts and chrome catalysts (containing Cr, e.g., chromium oxide catalysts), and the polymerizing is carried out in a single reactor (i.e., in the FB-GPP reactor), and the operating conditions are effective for making the bimodal ethylene-co-1-hexene copolymer composition with the combination of melt index (5) ($I_5$), melt strength, and, optionally, shear thinning properties and the combination of strain hardening modulus and accelerated FNCT performance. The effective operating conditions include reactor bed temperature, hydrogen-to-ethylene ($H_2/O_2$) molar ratio, and 1-hexene-to-ethylene ($C_6/O_2$) molar ratio. Other than that, the method is not particularly limited.

A pipe consisting essentially of the bimodal ethylene-co-1-hexene copolymer composition. The pipe is characterized by enhanced (increased) inhibition of slow crack growth as measured by accelerated FNCT performance. With "consisting essentially of", the film is free of other polyolefin polymers, but otherwise its constituents are not particularly limited.

A method of making a pipe, the method comprising melting the bimodal ethylene-co-1-hexene copolymer composition to give a melt thereof; extruding the melt into an initial pipe; optionally resizing the pipe; and cooling the initial or resized pipe. The method may be conducted using a pipe forming machine.

A manufactured article comprising the bimodal ethylene-co-1-hexene copolymer composition.

DETAILED DESCRIPTION

The Summary and Abstract are incorporated here by reference. Certain embodiments are described below as numbered aspects for easy cross-referencing.

Aspect 1. A bimodal ethylene-co-1-hexene copolymer composition having a density from 0.945 to 0.960 gram per cubic centimeter (g/cm$^3$), measured according to ASTM D792-13, Method B; a molecular mass dispersity ($M_w/M_n$), $Đ_M$, from 11.0 to 25.0, wherein $M_w$ and $M_n$ are measured according to the Gel Permeation Chromatography (GPC) Test Method; and consisting essentially of a higher molecular weight ethylene-co-1-hexene copolymer component (HMW component), having a molecular weight distribution (Mw/Mn) greater than 3.75 (>3.75), alternatively from 3.76 to 10.0, alternatively 3.80 to 9.40, and either a lower molecular weight polyethylene homopolymer component or a lower molecular weight ethylene-co-1-hexene copolymer component (LMW component), wherein the LMW component has a molecular weight distribution (Mw/Mn) from 2.75 to 3.35; and having a component fraction split characterized by a weight fraction of the HMW component from 35.0 to 65.0 wt %, alternatively from 36.0 to 50.0 wt % and a weight fraction of the LMW component fraction from 65.0 to 35.0 wt %, alternatively from 64.0 to 50.0 wt %, respectively, of the combined weight of the HMW and LMW components, measured according to the GPC Test Method; and wherein when in melted form at 190° C., the bimodal ethylene-co-1-hexene copolymer composition is characterized by properties (a), (b), and optionally (c): (a) a melt flow index (5 kg) ($I_5$ or $MFI_5$) from 0.15 to 0.30 gram per 10 minutes (g/10 min.), (b) peak melt strength from 18 to 29 centiNewtons (cN), and optionally (c) shear thinning index, $\eta_{0.01}/\eta_{100}$, is from 96 to 125; and when in solid form the bimodal ethylene-co-1-hexene copolymer composition is characterized by properties (d) and (e): (d) strain hardening modulus from 50 to 75 megapascals (MPa) and (e) accelerated full-notch creep test (FNCT) performance from 401 to 700.0 hours; wherein the melt flow index (5 kg) is measured according to ASTM D1238-13 (190° C., 5.0 kg), the shear thinning index is measured according to Shear Thinning Index Test Method (190° C.), the peak melt strength is measured at the highest peak in a plot of melt strength versus a range of velocity from 10 to 50 millimeters per second (mm/s) according to Melt Strength Test Method (described herein, Göttfert Rheotens tester, 190° C.,), the strain hardening modulus is measured according to ISO 18488:2015, and the accelerated FNCT performance is measured according to ISO 16770:2004 at 90° C. and at an actual stress of 5.0 MPa in 2 weight percent (wt %) lauramine oxide in water. The "I" means division. Properties (a) to (c) are collectively melt properties. In some aspects, the composition is not, alternatively is characterized by property (c). Properties (d) and (e) are resin properties. The bimodal ethylene-co-1-hexene copolymer composition may consist essentially of the higher molecular weight ethylene-co-1-hexene copolymer component and the lower molecular weight polyethylene homopolymer component. The bimodal ethylene-co-1-hexene copolymer composition may consist essentially of the higher molecular weight ethylene-co-1-hexene copolymer component and the lower molecular weight ethylene-co-1-hexene copolymer component.

Aspect 2. The bimodal ethylene-co-1-hexene copolymer composition of aspect 1 characterized by any one of property limitations (i) to (viii): (i) the density is from 0.9450 to 0.9590 g/cm$^3$, alternatively 0.9480 to 0.9560 g/cm$^3$, alternatively 0.9485 to 0.9585 g/cm$^3$, measured according to ASTM D792-13, Method B; (ii) the component fraction split is characterized by a weight fraction of the HMW component from 44.0 to 52.0 wt %, alternatively from 48 to 56.0 wt %; and a weight fraction of the LMW component fraction from 56.0 to 48.0 wt %, alternatively from 52.0 to 44.0 wt %, respectively, of the combined weight of the HMW and LMW components, measured according to the GPC Test Method; (iii) the molecular mass dispersity ($M_w/M_n$), $Đ_M$, is from 11.0 to 23.0, alternatively from 15.0 to 25, alternatively from 15.0 to 22.5, wherein $M_w$ and $M_n$ are measured according to the GPC Test Method; (iv) the (a) MFI$_5$ is from 0.15 to 0.24 g/10 min., alternatively 0.180 to 0.30 g/10 min., alternatively 0.181 to 0.214 g/10 min., alternatively 0.181 to 0.185 g/10 min., alternatively 0.205 to 0.214 g/10 min.; (v) the (c) shear thinning index, $\eta_{0.01}/\eta_{100}$, is from 99 to 115, alternatively 100.0 to 110.0; (vi) the (b) peak melt strength is from 20.0 to 28 cN, alternatively from 21 to 29 cN, alternatively from 22 to 28 cN, alternatively 23 to 27 cN, alternatively 24 to 26 cN; (vii) the (d) strain hardening modulus is from 55 to 70.0 MPa; (viii) the (e) accelerated FNCT performance is from 401 to 600.0 hours, alternatively from 401 to 540 hours, alternatively from 460 to 600 hours, alternatively 465 to 535 hours. Alternatively, the bimodal ethylene-co-1-hexene copolymer composition is characterized by a combination of two or more such limitations according to any one of limitations (ix) to (xxxviii): (ix) both (i) and (ii); (x) both (i) and (iii); (xi) both (i) and (iv); (xii) both (i) and (v); (xiii) both (i) and (vi); (xiv) both (i) and (vii); (xv) both (i) and (viii); (xvi) both (ii) and (iii); (xvii) both (ii) and (iv); (xviii) both (ii) and (v); (xix) both (ii) and (vi); (xx) both (ii) and (vii); (xxi) both (ii) and (viii); (xxii) both (iii) and (iv); (xxiii) both (iii) and (v); (xxiv) both (iii) and (vi); (xxv) both (iii) and (vii); (xxvi) both (iii) and (viii); (xxvii) both (iv) and (v); (xxviii) both (iv) and (vi); (xxix) both (iv) and (vii); (xxx) both (iv) and (viii); (xxxi) both (v) and (vi); (xxxii) both (v) and (vii); (xxxiii) both (v) and (viii); (xxxiv) both (vi) and (vii); (xxxv) both (vi) and (viii); (xxxvi) both (vii) and (viii); (xxxvii) any seven of (i) to (viii); and (xxxviii) each of (i) to (viii).

Aspect 3. The bimodal ethylene-co-1-hexene copolymer composition of aspect 1 or 2 further characterized by any one of melt property limitations (i) to (iii): (i) a high load melt index from 1 to 10 g/10 min., alternatively from 4 to 10 g/10 min., alternatively from 1 to 7 g/10 min., alternatively from 5.0 to 6.0 g/10 min., measured according to ASTM D1238-13 (190° C., 21.6 kg, HLMI or $I_{21}$); (ii) a melt flow ratio $I_{21}/I_5$ ("MFR5") from 20 to 40, alternatively from 26 to 40, alternatively from 20 to 33, alternatively from 26 to 33, wherein the $I_{21}$ and $I_5$ values used to calculate the MFR5 are each in g/10 min. and are measured according to ASTM D1238-13 (190° C., 21.6 kg, "$I_{21}$"; and 190° C., 5.0 kg, "$I_5$", respectively); (iii) both (i) and (ii).

Aspect 4. The bimodal ethylene-co-1-hexene copolymer composition of any one of aspects 1 to 3 further characterized by any one of resin property limitations (i) to (iv): (i) a weight-average molecular weight ($M_w$) from 300,000 to 400,000 grams per mole (g/mol), alternatively from 300,000 to 360,000 g/mol, alternatively from 330,000 to 400,000 g/mol, alternatively from 330,000.0 to 356,000 g/mol; (ii) a number-average molecular weight ($M_n$) from 10,000 to 30,000 grams g/mol, alternatively from 10,000 to 24,000 g/mol, alternatively from 14,000 to 30,000 g/mol, alternatively from 14,000.0 to 24,000 g/mol; (iii) a z-average molecular weight ($M_z$) from 2,000,000 to 3,400,000 g/mol, alternatively from 2,000,000 to 3,100,000 g/mol, alternatively from 2,400,000 to 3,400,000 g/mol, alternatively from 2,400,000 to 3,100,000 g/mol; (iv) a butyl branch frequency per 1,000 carbon atoms (bbf/1000C) from 1.2 to 1.5, alternatively from 1.25 to 1.50, alternatively from 1.2 to 1.44, alternatively from 1.27 to 1.44, as measured according to the Butyl Branch Frequency Test Method; wherein $M_w$, $M_n$ and $M_z$ are measured according to the GPC Test Method. Alternatively, by any one of limitations (v) to (xii): (v) both (i) and (ii); (vi) both (i) and (iii); (vii) both (i) and (iv); (viii) both (ii) and (iii); (ix) both (ii) and (iv); (x) both (iii) and (iv); (xi) any three of (i) to (iv); and (xii) each of (i) to (iv).

Aspect 5. A method of synthesizing the bimodal ethylene-co-1-hexene copolymer composition of any one of aspects 1 to 4, the method consisting essentially of copolymerizing ethylene (monomer) and 1-hexene (comonomer), and copolymerizing fresh ethylene and, optionally, fresh 1-hexene, with a combination of a bimodal catalyst system and a trim catalyst in the presence of molecular hydrogen gas (H$_2$) and, optionally, an induced condensing agent (ICA) in one polymerization reactor (e.g., one fluidized bed, gas phase polymerization reactor (FB-GPP reactor)) under effective polymerizing conditions to give an initial bimodal ethylene-co-1-hexene copolymer composition; wherein the bimodal catalyst system is made by contacting a first activator with bis(2-(pentamethylphenylamido)ethyl)-amine zirconium dibenzyl and a (methylcyclopentadienyl)(1,3-dimethyl-4,5,6,7-tetrahydroindenyl)zirconium dimethyl; wherein the trim catalyst is made by contacting a second activator with (methylcyclopentadienyl)(1,3-dimethyl-4,5,6,7-tetrahydroindenyl)zirconium dimethyl; wherein the first and second activators are the same or different; and wherein the effective polymerizing conditions comprise a reaction temperature from 90 degrees)(° to 110° Celsius (C.), alternatively 98° to 107° C., alternatively 99° to 106° C.; a molar ratio of the molecular hydrogen gas to the ethylene (H$_2$/C$_2$ molar ratio) from 0.001 to 0.0050, alternatively 0.0020 to 0.0030, alternatively 0.00220 to 0.00290; and a molar ratio of the 1-hexene ("C$_6$") to the ethylene (C$_6$/C$_2$ molar ratio) from 0.00450 to 0.01000, alternatively 0.0050 to 0.0080, alternatively 0.0055 to 0.0075. The first activator may be an alkylaluminoxane (alkylalumoxane) and the second activator independently may be an alkylaluminoxane or an alkylaluminum compound.

Aspect 6. The method of aspect 5 further consisting essentially of removing the initial bimodal ethylene-co-1-hexene copolymer composition from the reactor (e.g., the FB-GPP reactor) to give a removed bimodal ethylene-co-1-hexene copolymer composition. In some aspects the removed bimodal ethylene-co-1-hexene copolymer composition may be purged with an inert gas (e.g., N$_2$) to remove entrained hydrocarbons therefrom and/or treated with a stream of humidified nitrogen (N$_2$) gas to deactivate in situ any residual amount of the bimodal catalyst system contained therein to give a purged bimodal ethylene-co-1-hexene copolymer composition. In some aspects the removed or purged bimodal ethylene-co-1-hexene copolymer composition is degassed to remove volatile organic compounds therefrom to give a degassed bimodal ethylene-co-1-hexene copolymer composition. In some aspects a melt of the removed, purged, or degassed bimodal ethylene-co- 1-hexene copolymer composition may be oxygen tailored in an extruder to give an oxygen-tailored bimodal ethylene-co-1-hexene copolymer composition. In some aspects the removed, purged, degassed, or oxygen tailored bimodal ethylene-co-1-hexene copolymer composition is independently pelletized to give pellets thereof (pelletized bimodal ethylene-co-1-hexene copolymer composition). The initial, removed, purged, degassed, oxygen tailored, and pelletized embodiments of the bimodal ethylene-co-1-hexene copolymer composition are collectively referred to as "the bimodal ethylene-co-1-hexene copolymer composition", which may be that of any one of aspects 1 to 4. The bimodal ethylene-co-1-hexene copolymer composition may be the initial, removed, purged, degassed, or pelletized embodiment thereof. The method may further comprise a step of combining the bimodal ethylene-co-1-hexene copolymer composition with one or more pipe additives useful in polyethylene pipe. The combining may comprising melt mixing the one or more pipe additives into a melt of the bimodal ethylene-co-1-hexene copolymer composition to give a bimodal ethylene-co-1-hexene copolymer/additive formulation. Alternatively, the combining may comprise soaking or injecting the one or more pipe additives into the pellets of the pelletized bimodal ethylene-co-1-hexene copolymer composition to give the bimodal ethylene-co-1-hexene copolymer/additive formulation.

Aspect 7. A pipe consisting essentially of the bimodal ethylene-co-1-hexene copolymer composition of any one of aspects 1 to 4 ("the pipe"), alternatively the bimodal ethylene-co-1-hexene copolymer/additive formulation. The "consisting essentially of" transitional phrase means the pipe is free of other polyolefin polymers, but otherwise its constituents are not particularly limited. The pipe may be used in fluid (gas and/or liquid) transporting applications. In some aspects the bimodal ethylene-co-1-hexene copolymer composition of the pipe is not the oxygen tailored bimodal ethylene-co-1-hexene copolymer composition.

Aspect 8. A method of making a pipe, the method comprising method of making a pipe, the method comprising steps (A), (B1) or (B2), optionally (C), and (D): (A) melting the bimodal ethylene-co-1-hexene copolymer composition to give a melt thereof; (B1) extruding the melt through an annular die configured for forming a cylinder so as to make an initial solid wall cylinder of the bimodal ethylene-co-1-hexene copolymer composition or (B2) extruding and spirally winding the melt around a mandrel configured for forming an unsealed-seam profile wall so as to make an unsealed-seam profile wall, and heat-fusing the unsealed seam of the unsealed-seam profile wall to make an initial sealed-seam wall cylinder; (C) optionally resizing the initial solid wall cylinder or the initial sealed-seam wall cylinder to make a resized wall cylinder having a different diameter; and (D) cooling the initial solid wall cylinder, the initial sealed-seam wall cylinder, or the resized wall cylinder, thereby making a solid wall pipe or a seam-sealed wall pipe, respectively. Step (B1) may be conducted using a solid wall pipe forming machine and step (B2) using a mandrel and a spirally-winding profile wall forming and sealing machine. The pipe consists essentially of the bimodal ethylene-co-1-hexene copolymer of any one of aspects 1 to 4 ("the pipe"). The "consisting essentially of" transitional phrase means the pipe is free of other polyolefin polymers, but otherwise its constituents are not particularly limited.

Aspect 9. A pipe made by the method of aspect 8 and consisting essentially of the bimodal ethylene-co-1-hexene copolymer composition of any one of aspects 1 to 4 ("the pipe"). With "consisting essentially of", the pipe is free of other polyolefin polymers, but otherwise its constituents are not particularly limited. The pipe may be characterized by enhanced (increased) slow crack growth. The pipe may be used in fluid transporting applications. The pipe may be characterized as meeting pipe industry specifications for a PE100 pipe or a PE100 RC pipe.

Aspect 10. A manufactured article comprising the bimodal ethylene-co-1-hexene copolymer composition, wherein the manufactured article is not a pipe.

The bimodal ethylene-co-1-hexene copolymer composition is not a physical blend or a melt blend of two different, separately made copolymers or of a separately made copolymer and a separately made homopolymer. The bimodal ethylene-co-1-hexene copolymer composition is made by a method using a bimodal catalyst system in a single reactor, which method beneficially enables the Mw/Mn of the HMW component to be higher than a Mw/Mn of a comparative HMW component made in staged reactor wherein the staged reactor uses the same catalyst to make both the HMW and LMW components In some aspects the bimodal ethylene-co-1-hexene copolymer composition may have a transition metal content, alternatively a Zr content, of less than 10 weight parts per million (ppm) measured according to inductively coupled plasma mass spectrometry (ICP-MS).

Definitions

Activator. A substance, other than the catalyst or one of the substrates, that increases the rate of a catalyzed reaction without itself being consumed. Typically, the activator contains aluminum and/or boron.

Bimodal. Two, and only two, modalities or modes.

Bimodal in reference to a copolymer composition (e.g., the ethylene-co-1-hexene copolymer composition) means a composition consisting essentially of a higher molecular weight component and a lower molecular weight component, wherein the higher molecular weight component consists of a first group of polymer macromolecules made by a first catalyst in a first reactor under a first set of molecular weight-effective polymerization process conditions (e.g., first reactor bed temperature, first $H_2/O_2$ gas molar ratio, and/or first comonomer/monomer molar ratio) and the lower molecular weight component consists of a second group of polymer macromolecules made by a second catalyst in a second reactor under a second set of molecular weight-effective polymerization process conditions (e.g., second reactor bed temperature, second $H_2/O_2$ gas molar ratio, and/or second comonomer/monomer molar ratio), wherein at least one of the following differences are present: (a) the first catalyst is different in catalytic metal and/or ligand composition than that/those of the second catalyst; (b) the first reactor is different than the second reactor or the first and second reactors are the same reactor but the polymerization reaction making the higher molecular weight component is done at a different time than the polymerization reaction making the lower molecular weight component; (c) at least one of the first set of molecular weight-effective polymerization process conditions is different than that one of the second set of molecular weight-effective polymerization process conditions. Bimodal polymer compositions include post-reactor blends and reactor blends (wherein the lower and higher molecular weight components are synthesized in the same reactor). The bimodal copolymer composition may be characterized by a two peaks separated by a distinguishable local minimum therebetween in a plot of dW/dLog (MW) on the y-axis versus Log(MW) on the x-axis to give a Gel Permeation Chromatograph (GPC) chromatogram, wherein Log(MW) and dW/dLog (MW) are as defined herein and are measured by Gel Permeation Chromatograph (GPC) Test Method described herein.

Bimodal when referring to a catalyst system means a catalyst system that contains two different catalysts for catalyzing a same polymerization process (e.g., olefin polymerization) and producing a bimodal polymer composition. Two catalysts are different if they differ from each other in at least one of the following characteristics: (a) their catalytic metals are different (Ti versus Zr, Zr versus Hf, Ti versus Hf; not activator metals such as Al); (b) one catalyst has a functional ligand covalently bonded to its catalytic metal and the other catalyst is free of functional ligands bonded to its catalytic metal; (c) both catalysts have functional ligands covalently bonded to their catalytic metal and the structures of at least one of functional ligand of one of the catalysts is different than the structure of each of the functional ligand(s) of the other catalyst (e.g., cyclopentadienyl versus propylcyclopentadienyl or butylcyclopentadienyl versus (pentamethylphenylamido)ethyl)-amine); and (d) for catalysts disposed on a support material, the compositions of the support materials are different. Functional ligands do not include leaving groups X as defined later. Two catalysts of a bimodal catalyst system may be disposed on the same support material, either on the same particles of the same support material or each on different particles of the same support material. The same catalyst in terms of catalytic metal and ligands wherein a portion thereof is disposed on a support material and a different portion thereof is dissolved in an inert solvent, the different portions do not by themselves constitute a bimodal catalyst system.

Catalyst. A material that enhances rate of a reaction (e.g., the polymerization of ethylene and 1-hexene) and is not completely consumed thereby.

Catalyst system. A combination of a catalyst per se and a companion material such as a modifier compound for attenuating reactivity of the catalyst, a support material on which the catalyst is disposed, a carrier material in which the catalyst is disposed, or a combination of any two or more thereof, or a reaction product of a reaction thereof.

Consisting essentially of, consist(s) essentially of, and the like. Partially-closed ended expressions that exclude anything that would affect the basic and novel characteristics of that which they describe, but otherwise allow anything else. In some aspects any one, alternatively each "comprising" or "comprises" may be replaced by "consisting essentially of" or "consists essentially of", respectively; alternatively by "consisting of" or "consists of", respectively.

Consisting of and consists of. Closed ended expressions that exclude anything that is not specifically described by the limitation that it modifies. In some aspects any one, alternatively each expression "consisting essentially of" or "consists essentially of" may be replaced by the expression "consisting of" or "consists of", respectively.

Dry. Generally, a moisture content from 0 to less than 5 parts per million based on total parts by weight. Materials fed to the reactor(s) during a polymerization reaction are dry.

Feed. Quantity of reactant or reagent that is added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Feed line. A pipe or conduit structure for transporting a feed.

Inert. Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Metallocene catalyst. Homogeneous or heterogeneous material that contains a cyclopentadienyl ligand-metal complex and enhances olefin polymerization reaction rates. Substantially single site or dual site. Each metal is a transition metal Ti, Zr, or Hf. Each cyclopentadienyl ligand independently is an unsubstituted cyclopentadienyl group or a hydrocarbyl-substituted cyclopentadienyl group. In some aspects the metallocene catalyst has two cyclopentadienyl ligands, and at least one, alternatively both of the cyclopentenyl ligands independently is a hydrocarbyl-substituted cyclopentadienyl group. Each hydrocarbyl-substituted cyclopentadienyl group may independently have 1, 2, 3, 4, or 5 hydrocarbyl substituents. Each hydrocarbyl substituent may independently be a ($C_1$-$C_4$)alkyl. Two or more substituents may be bonded together to form a divalent substituent, which with carbon atoms of the cyclopentadienyl group may form a ring.

Trim catalyst. A quantity of a metallocene catalyst that is identical, except for an optional difference in X group described later, to the metallocene catalyst of the bimodal catalyst system. Trim catalyst is usually fed (e.g., to the FB-GPP reactor) as a solution of the catalyst dissolved in an inert liquid (non-polar, aprotic, e.g., hydrocarbon solvent). The trim catalyst is used with the bimodal catalyst system to modify at least one property of the copolymer composition made thereby. Examples of such at least one property are density, melt index $I_2$, flow index $I_{21}$, melt flow ratio ($I_{21}/I_2$), and molecular mass dispersity ($M_w/M_n$), $Đ_M$.

Ziegler-Natta catalysts. Heterogeneous materials that enhance olefin polymerization reaction rates and are prepared by contacting inorganic titanium compounds, such as titanium halides supported on a magnesium chloride support, with an activator.

Polymerization Reactor and Method

In an illustrative pilot plant process for making the bimodal ethylene-co-1-hexene copolymer, a fluidized bed, gas-phase polymerization reactor ("FB-GPP reactor") having a reaction zone dimensioned as 304.8 mm (twelve inch) internal diameter and a 2.4384 meter (8 feet) in straight-side height and containing a fluidized bed of granules of the bimodal ethylene-co-1-hexene copolymer composition. Configure the FB-GPP reactor with a recycle gas line for flowing a recycle gas stream. Fit the FB-GPP reactor with gas feed inlets and polymer product outlet. Introduce gaseous feed streams of ethylene and hydrogen together with comonomer (e.g., 1-hexene) below the FB-GPP reactor bed into the recycle gas line.

Polymerization operating conditions are any variable or combination of variables that may affect a polymerization reaction in the GPP reactor or a composition or property of a bimodal ethylene-co-1-hexene copolymer composition product made thereby. The variables may include reactor design and size, catalyst composition and amount; reactant composition and amount; molar ratio of two different reactants; presence or absence of feed gases such as $H_2$ and/or $O_2$, molar ratio of feed gases versus reactants, absence or concentration of interfering materials (e.g., $H_2O$), absence or presence of an induced condensing agent (ICA), average polymer residence time in the reactor, partial pressures of constituents, feed rates of monomers, reactor bed temperature (e.g., fluidized bed temperature), nature or sequence of process steps, time periods for transitioning between steps. Variables other than that/those being described or changed by the method or use may be kept constant.

In operating the polymerization method, control individual flow rates of ethylene ("$C_2$"), hydrogen ("$H_2$") and 1-hexene ("$C_6$" or "$C_x$," wherein x is 6) to maintain a fixed comonomer to ethylene monomer gas molar ratio ($C_x/C_2$, e.g., $C_6/C_2$) equal to a described value (e.g., 0.00560 or 0.00703), a constant hydrogen to ethylene gas molar ratio ("$H_2/C_2$") equal to a described value (e.g., 0.00229 or 0.00280), and a constant ethylene ("$C_2$") partial pressure equal to a described value (e.g., 1,000 kPa). Measure concentrations of gases by an in-line gas chromatograph to understand and maintain composition in the recycle gas stream. Maintain a reacting bed of growing polymer particles in a fluidized state by continuously flowing a make-up feed and recycle gas through the reaction zone. Use a superficial gas velocity of 0.49 to 0.67 meter per second (m/sec) (1.6 to 2.2 feet per second (ft/sec)). Operate the FB-GPP reactor at a total pressure of about 2344 to about 2413 kilopascals (kPa) (about 340 to about 350 pounds per square inch-gauge (psig)) and at a described first reactor bed temperature RBT. Maintain the fluidized bed at a constant height by withdrawing a portion of the bed at a rate equal to the rate of production of particulate form of the bimodal ethylene-co-1-hexene copolymer composition, which production rate may be from 10 to 20 kilograms per hour (kg/hr), alternatively 13 to 18 kg/hr. Remove the product bimodal ethylene-co-1-hexene copolymer composition semi-continuously via a series of valves into a fixed volume chamber, wherein this removed bimodal ethylene-co-1-hexene copolymer composition is purged to remove entrained hydrocarbons and treated with a stream of humidified nitrogen ($N_2$) gas to deactivate any trace quantities of residual catalyst. See polymerization method described herein.

The bimodal catalyst system may be fed into the polymerization reactor(s) in "dry mode" or "wet mode", alternatively dry mode, alternatively wet mode. The dry mode is a dry powder or granules. The wet mode is a suspension in an inert liquid such as mineral oil.

Induced condensing agent (ICA). An inert liquid useful for cooling materials in the polymerization reactor(s) (e.g., a fluidized bed reactor); its use is optional. The ICA may be a ($C_5$-$C_{20}$)alkane, alternatively a ($C_{11}$-$C_{20}$)alkane, alternatively a ($C_5$-$C_{10}$)alkane, alternatively a ($C_5$)alkane, e.g., pentane or 2-methylbutane; a hexane; a heptane; an octane; a nonane; a decane; or a combination of any two or more thereof. The ICA may be 2-methylbutane (i.e., isopentane). Aspects of the method of polymerization that use the ICA may be referred to as being an induced condensing mode operation (ICMO). ICMO is described in U.S. Pat. Nos. 4,453,399; 4,588,790; 4,994,534; 5,352,749; 5,462,999; and 6,489,408. Measure concentration of ICA in gas phase measured using gas chromatography by calibrating peak area percent to mole percent (mol %) with a gas mixture standard of known concentrations of ad rem gas phase components. Concentration of ICA may be from 1 to 10 mol %, alternatively from 3 to 8 mol %.

The polymerization method uses a gas-phase polymerization (GPP) reactor, such as a stirred-bed gas phase polymerization reactor (SB-GPP reactor) or a fluidized-bed gas-phase polymerization reactor (FB-GPP reactor), to make the bimodal ethylene-co-1-hexene copolymer composition. Such reactors and methods are generally well-known in the art. For example, the FB-GPP reactor/method may be as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These SB-GPP and FB-GPP polymerization reactors and processes either mechanically agitate or fluidize by continuous flow of gaseous monomer and diluent the polymerization medium inside the reactor, respectively. Other useful reactors/processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

The polymerization conditions may further include one or more additives such as a chain transfer agent or a promoter. The chain transfer agents are well known and may be alkyl metal such as diethyl zinc. Promoters are known such as in U.S. Pat. No. 4,988,783 and may include chloroform, $CFCl_3$, trichloroethane, and difluorotetrachloroethane. Prior to reactor start up, a scavenging agent may be used to react with moisture and during reactor transitions a scavenging agent may be used to react with excess activator. Scavenging agents may be a trialkylaluminum. Gas phase polymerizations may be operated free of (not deliberately added) scavenging agents. The polymerization conditions for gas phase polymerization reactor/method may further include an amount (e.g., 0.5 to 200 ppm based on all feeds into reactor) of a static control agent and/or a continuity additive such as aluminum stearate or polyethyleneimine. The static control agent may be added to the FB-GPP reactor to inhibit formation or buildup of static charge therein.

Start-up or restart of the GPP reactor may be illustrated with a fluidized bed, GPP reactor. The start-up of a recommissioned FB-GPP reactor (cold start) or restart of a transitioning FB-GPP reactor (warm start) includes a time period that is prior to reaching steady-state polymerization conditions of step (a). Start-up or restart may include the use of a polymer seedbed preloaded or loaded, respectively, into the fluidized bed reactor. The polymer seedbed may be composed of powder of a polyethylene such as a polyethylene homopolymer or previously made batch of the bimodal ethylene-co-1-hexene copolymer composition.

Start-up or restart of the FB-GPP reactor may also include gas atmosphere transitions comprising purging air or other unwanted gas(es) from the reactor with a dry (anhydrous) inert purge gas, followed by purging the dry inert purge gas from the FB-GPP reactor with dry ethylene gas. The dry inert purge gas may consist essentially of molecular nitrogen ($N_2$), argon, helium, or a mixture of any two or more thereof. When not in operation, prior to start-up (cold start), the FB-GPP reactor contains an atmosphere of air. The dry inert purge gas may be used to sweep the air from a recommissioned FB-GPP reactor during early stages of start-up to give a FB-GPP reactor having an atmosphere consisting of the dry inert purge gas. Prior to restart (e.g., after a change in seedbeds), a transitioning FB-GPP reactor may contain an atmosphere of unwanted ICA or other unwanted gas or vapor. The dry inert purge gas may be used to sweep the unwanted vapor or gas from the transitioning FB-GPP reactor during early stages of restart to give the FB-GPP reactor an atmosphere consisting of the dry inert purge gas. Any dry inert purge gas may itself be swept from the FB-GPP reactor with the dry ethylene gas. The dry ethylene gas may further contain molecular hydrogen gas such that the dry ethylene gas is fed into the fluidized bed reactor as a mixture thereof. Alternatively the dry molecular hydrogen gas may be introduced separately and after the atmosphere of the fluidized bed reactor has been transitioned to ethylene. The gas atmosphere transitions may be done prior to, during, or after heating the FB-GPP reactor to the reaction temperature of the polymerization conditions.

Start-up or restart of the FB-GPP reactor also includes introducing feeds of reactants and reagents thereinto. The reactants include the ethylene and the alpha-olefin (e.g., 1-hexene). The reagents fed into the fluidized bed reactor include the molecular hydrogen gas and the induced condensing agent (ICA) and the bimodal catalyst system and the trim catalyst.

In an embodiment the method uses a pilot scale fluidized bed gas phase polymerization reactor (Pilot Reactor) that comprises a reactor vessel containing a fluidized bed of a powder of the bimodal ethylene-co-1-hexene copolymer composition, and a distributor plate disposed above a bottom head, and defining a bottom gas inlet, and having an expanded section, or cyclone system, at the top of the reactor vessel to decrease amount of resin fines that may escape from the fluidized bed. The expanded section defines a gas outlet. The Pilot Reactor further comprises a compressor blower of sufficient power to continuously cycle or loop gas around from out of the gas outlet in the expanded section in the top of the reactor vessel down to and into the bottom gas inlet of the Pilot Reactor and through the distributor plate and fluidized bed. The Pilot Reactor further comprises a cooling system to remove heat of polymerization and maintain the fluidized bed at a target temperature. Compositions of gases such as ethylene, alpha-olefin (e.g., 1-hexene), and hydrogen being fed into the Pilot Reactor are monitored by an in-line gas chromatograph in the cycle loop in order to maintain specific concentrations that define and enable control of polymer properties. The bimodal catalyst system may be fed as a slurry or dry powder into the Pilot Reactor from high pressure devices, wherein the slurry is fed via a syringe pump and the dry powder is fed via a metered disk. The bimodal catalyst system typically enters the fluidized bed in the lower ⅓ of its bed height. The Pilot Reactor further comprises a way of weighing the fluidized bed and isolation ports (Product Discharge System) for discharging the powder of bimodal ethylene-co-1-hexene copolymer composition from the reactor vessel in response to an increase of the fluidized bed weight as polymerization reaction proceeds.

In some embodiments the FB-GPP reactor is a commercial scale reactor such as a UNIPOL™ reactor or UNIPOL™ II reactor, which are available from Univation Technologies, LLC, a subsidiary of The Dow Chemical Company, Midland, Michigan, USA.

Catalysts, Support Materials, Activators

The bimodal catalyst system used in the method of synthesizing may consist essentially of a metallocene catalyst and a non-metallocene molecular catalyst, which are different in functional ligand and/or catalytic metal M. The bimodal catalyst system may also consist essentially of a solid support material and/or at least one activator and/or at least one activator species, which is a by-product of reacting the metallocene catalyst or non-metallocene molecular catalyst with the first activator. The metallocene catalyst of the bimodal catalyst system may be (methylcyclopentadienyl)(1,3-dimethyl-4,5,6,7-tetrahydroindenyl)zirconium dimethyl and the non-metallocene molecular catalyst of the bimodal catalyst system may be bis(2-(pentamethylphenylamido)ethyl)-amine zirconium dibenzyl.

Without being bound by theory, it is believed that the bis(2-(pentamethylphenylamido)ethyl)-amine zirconium dibenzyl is effective for making the HMW component of the bimodal ethylene-co-1-hexene copolymer composition and the (methylcyclopentadienyl)(1,3-dimethyl-4,5,6,7-tetrahydroindenyl)zirconium dimethyl is independently effective for making the LMW component of the bimodal ethylene-co-1-hexene copolymer composition. The molar ratio of the two catalysts of the bimodal catalyst system may be based on the molar ratio of their respective catalytic metal atom (M, e.g., Zr) contents, which may be calculated from ingredient weights thereof or may be analytically measured.

The catalysts of the bimodal catalyst system may be disposed by spray-drying onto a solid support material prior to being contacted with an activator. The solid support material may be uncalcined or calcined prior to being contacted with the catalysts. The solid support material may be a hydrophobic fumed silica (e.g., a fumed silica treated with dimethyldichlorosilane). The bimodal (unsupported or supported) catalyst system may be in the form of a powdery, free-flowing particulate solid.

Support material. The support material may be an inorganic oxide material. The terms "support" and "support material" are the same as used herein and refer to a porous inorganic substance or organic substance. In some embodiments, desirable support materials may be inorganic oxides that include Group 2, 3, 4, 5, 13 or 14 oxides, alternatively Group 13 or 14 atoms. Examples of inorganic oxide-type support materials are silica, alumina, titania, zirconia, thoria, and mixtures of any two or more of such inorganic oxides. Examples of such mixtures are silica-chromium, silica-alumina, and silica-titania.

The inorganic oxide support material is porous and has variable surface area, pore volume, and average particle size. In some embodiments, the surface area is from 50 to 1000 square meter per gram ($m^2/g$) and the average particle size is from 20 to 300 micrometers (μm). Alternatively, the pore volume is from 0.5 to 6.0 cubic centimeters per gram ($cm^3/g$) and the surface area is from 200 to 600 $m^2/g$. Alternatively, the pore volume is from 1.1 to 1.8 $cm^3/g$ and the surface area is from 245 to 375 $m^2/g$. Alternatively, the pore volume is from 2.4 to 3.7 $cm^3/g$ and the surface area is from 410 to 620 $m^2/g$. Alternatively, the pore volume is from 0.9 to 1.4 $cm^3/g$ and the surface area is from 390 to 590 $m^2/g$. Each of the above properties are measured using conventional techniques known in the art.

The support material may comprise silica, alternatively amorphous silica (not quartz), alternatively a high surface area amorphous silica (e.g., from 500 to 1000 $m^2/g$). Such silicas are commercially available from a number of sources including the Davison Chemical Division of W.R. Grace and Company (e.g., Davison 952 and Davison 955 products), and PQ Corporation (e.g., ES70 product). The silica may be in the form of spherical particles, which are obtained by a spray-drying process. Alternatively, MS3050 product is a silica from PQ Corporation that is not spray-dried. As procured, all of these silicas are not calcined (i.e., not dehydrated). Silica that is calcined prior to purchase may also be used as the support material.

Prior to being contacted with a catalyst, the support material may be pre-treated by heating the support material in air to give a calcined support material. The pre-treating comprises heating the support material at a peak temperature from 350° to 850° C., alternatively from 400° to 800° C., alternatively from 400° to 700° C., alternatively from 500° to 650° C. and for a time period from 2 to 24 hours, alternatively from 4 to 16 hours, alternatively from 8 to 12 hours, alternatively from 1 to 4 hours, thereby making a calcined support material. In some aspects the support material is a calcined support material.

The trim catalyst may be any one of the aforementioned metallocene catalysts. For convenience the trim catalyst is fed in solution in a hydrocarbon solvent (e.g., mineral oil or heptane). The hydrocarbon solvent may be an alkane, or a mixture of alkanes, wherein each alkane independently has from 5 to 20 carbon atoms, alternatively from 5 to 12 carbon atoms, alternatively from 5 to 10 carbon atoms. Each alkane independently may be acyclic or cyclic. Each acyclic alkane independently may be straight chain or branched chain. The acyclic alkane may be pentane, 1-methylbutane (isopentane), hexane, 1-methylpentane (isohexane), heptane, 1-methylhexane (isoheptane), octane, nonane, decane, or a mixture of any two or more thereof. The cyclic alkane may be cyclopentane, cyclohexane, cycloheptane, cyclooctane, cyclononane, cyclodecane, methycyclopentane, methylcyclohexane, dimethylcyclopentane, or a mixture of any two or more thereof.

For solubility in the hydrocarbon solvent, typically each of the group X of the trim catalyst independently is hydrocarbyl (e.g., benzyl, a $(C_1-C_5)$alkyl, or a $(C_2-C_5)$alkenyl; e.g., methyl or ethyl) or —$CH_2Si(CH_3)_3$. The groups X of the trim catalyst may be different than the X groups of the metallocene catalyst of the bimodal catalyst system. Nevertheless, upon activation by contact thereof with an activator, the active catalyst species resulting from the activation of the trim catalyst is essentially the same as the active catalyst species resulting from the activation of the metallocene catalyst of the bimodal catalyst system. For example, the metallocene catalyst of the bimodal catalyst system may be (methylcyclopentadienyl)(1,3-dimethyl-4,5,6,7-tetrahydroindenyl)zirconium dichloride (each X is Cl), and the trim catalyst may be (methylcyclopentadienyl)(1,3-dimethyl-4,5,6,7-tetrahydroindenyl)zirconium dialkyl (e.g., dimethyl wherein X is $CH_3$). Upon activation by treatment thereof with a suitable activator or cocatalyst, both the (methylcyclopentadienyl)(1,3-dimethyl-4,5,6,7-tetrahydroindenyl)zirconium dichloride and the (methylcyclopentadienyl)(1,3-dimethyl-4,5,6,7-tetrahydroindenyl)zirconium dimethyl effectively yield the same activated catalyst species.

Activator. Each catalyst of the bimodal catalyst system is activated by contacting it with the first activator. The trim catalyst is activated by contacting it with the second activator. Additional activators may be used. Any activator may be the same or different as another and independently may be a Lewis acid, a non-coordinating ionic activator, or an ionizing activator, or a Lewis base, an alkylaluminum, or an alkylaluminoxane (alkylalumoxane). The alkylaluminum may be a trialkylaluminum, alkylaluminum halide, or alkylaluminum alkoxide (diethylaluminum ethoxide). The trialkylaluminum may be trimethylaluminum, triethylaluminum ("TEAl"), tripropylaluminum, or tris(2-methylpropyl)aluminum. The alkylaluminum halide may be diethylaluminum chloride. The alkylaluminum alkoxide may be diethylaluminum ethoxide. The alkylaluminoxane may be a methylaluminoxane (MAO), ethylaluminoxane, 2-methylpropylaluminoxane, or a modified methylaluminoxane (MMAO). Each alkyl of the alkylaluminum or alkylaluminoxane independently may be a $(C_1-C_7)$alkyl, alternatively a $(C_1-C_6)$alkyl, alternatively a $(C_1-C_4)$alkyl. The molar ratio of activator's metal (Al) to a particular catalyst compound's metal (catalytic metal, e.g., Zr) may be 1000:1 to 0.5:1, alternatively 300:1 to 1:1, alternatively 150:1 to 1:1. Suitable activators are commercially available.

Once the first activator and the (bis(2-(pentamethylphenylamido)ethyl)-amine zirconium dibenzyl and (methylcyclopentadienyl)(1,3-dimethyl-4,5,6,7-tetrahydroindenyl)zirconium dimethyl) of the bimodal catalyst system contact each other, the catalysts of the bimodal catalyst system are activated and a first activator species may be made in situ. Once the second activator and the trim catalyst (a (methylcyclopentadienyl)(1,3-dimethyl-4,5,6,7-tetrahydroindenyl) zirconium dialkyl) contact each other, the trim catalyst is activated and a second activator species may be made in situ. The activator species may have a different structure or composition than the activator from which it is derived and may be a by-product of the activation of the catalyst or may be a derivative of the by-product. The corresponding activator species may be a derivative of the Lewis acid, non-coordinating ionic activator, ionizing activator, Lewis base, alkylaluminum, or alkylaluminoxane, respectively. An example of the derivative of the by-product is a methylaluminoxane species that is formed by devolatilizing during spray-drying of a bimodal catalyst system made with methylaluminoxane.

Each contacting step between activator and catalyst independently may be done either (a) in a separate vessel outside the GPP reactor (e.g., outside the FB-GPP reactor), (b) in a feed line to the GPP reactor, and/or (c) inside the GPP reactor (in situ). In option (a) the bimodal catalyst system, once its catalysts are activated, may be fed into the GPP reactor as a dry powder, alternatively as a slurry in a non-polar, aprotic (hydrocarbon) solvent. In option (c) the bimodal catalyst system may be fed into the reactor prior to activation via a first feed line, the first activator may be fed into the reactor via a second feed line, the trim catalyst may be fed into the reactor via a third feed line, and the second activator may be feed into the reactor via a fourth feed line. Any two of the first to fourth feed lines may be the same or different. The activator(s) may be fed into the reactor in "wet mode" in the form of a solution thereof in an inert liquid such as mineral oil or toluene, in slurry mode as a suspension, or in dry mode as a powder. Each contacting step may be done in separate vessels, feed lines, or reactors at the same or different times, or in the same vessel, feed line, or reactor at different times, to separately give the bimodal catalyst system and trim catalyst. Alternatively, the contacting steps may be done in the same vessel, feed line, or reactor at the same time to give a mixture of the bimodal catalyst system and trim catalyst in situ.

Bimodal Ethylene-Co-1-Hexene Copolymer Composition

Ethylene. A monomer of formula $H_2C=CH_2$.

1-Hexene. A monomer of formula $H_2C=C(H)CH_2CH_2CH_2CH_3$.

Ethylene-co-1-hexene copolymer or poly(ethylene-co-1-hexene) copolymer is a macromolecule comprising, alternatively consisting essentially of, alternatively consisting of, constituent units derived from ethylene monomer and constituent units derived from 1-hexene comonomer. The consisting essentially of means the macromolecule is free of constituent units not derived from ethylene or 1-hexene. The consisting of means the macromolecule is free of constituent units not derived from ethylene or 1-hexene and is composed of only carbon and hydrogen atoms.

Bimodal ethylene-co-1-hexene copolymer composition. A macromolecule, or collection of macromolecules, composed of repeat units wherein 50.0 to <100 mole percent (mol %), alternatively 70.0 to 99.99 mol %, alternatively 95.0 to 99.9 mol % of such repeat units are derived from ethylene monomer, and from >0 to 50.0 mol %, alternatively from 0.01 to 30.0 mol %, alternatively 0.1 to 5.0 mol % of the remaining repeat units are comonomeric units derived from 1-hexene; or collection of such macromolecules. The collection of macromolecules is characterized by two distinct peaks (not shoulders) in a plot of dW/dLog (MW) on the y-axis versus Log(MW) on the x-axis to give a Gel Permeation Chromatograph (GPC) chromatogram, wherein Log(MW) and dW/dLog (MW) are as defined below and measured by Gel Permeation Chromatograph (GPC) Test Method described herein.

The bimodal ethylene-co-1-hexene copolymer composition is a high molecular weight high density polyethylene (HMW HDPE). The bimodal ethylene-co-1-hexene copolymer composition may be further characterized by any one of the following limitations: a weight-average molecular weight ($M_w$) from 200,000.0 to 400,000.0 grams per mole (g/mol), alternatively 250,000.0 to 320,000.0 g/mol; a number-average molecular weight ($M_n$) from 6,000.0 to 11,000.0 g/mol, alternatively 7,000.0 to 9,000.0 g/mol; a z-average molecular weight ($M_z$) from 1,200,000.0 to 2,500,000.0 g/mol; a combination of any two thereof; and a combination of all three thereof; all measured according to the Gel Permeation Chromatography (GPC) Test Method.

The bimodal ethylene-co-1-hexene copolymer composition, pipe, and methods of making same are free of Ti and Cr metals.

The polymerizing conditions in the method of synthesizing are effective for making the bimodal ethylene-co-1-hexene copolymer composition characterized by the melt space described earlier and, optionally, the resin properties and/or pipe properties.

Pipe

The pipe. A cylindrically-shaped wall or tube having proximal and distal ends (openings) and defining a volumetric space therebetween and through which a fluid (gas, vapor, or liquid) or particulate solid may be transported. The wall of the pipe is defined by a thickness, and the size of the pipe is defined by its outer diameter and length. Resizing the pipe means changing the outer diameter of the pipe. The wall of the pipe may be of any shape including smooth, rough, circular, ovoid, of varying thickness or constant thickness. The pipe may be straight, bent, or curved. The volumetric space or capacity of the pipe is defined by its inner diameter and length. The pipe may be a solid wall pipe or a sealed-seam wall pipe, depending on whether the pipe is made by (i) extruding a melt through an annular die or (ii) extruding and spirally winding the melt around a mandrel configured for forming an unsealed-seam profile, and sealing the seam, respectively. The solid wall pipe may be made in outer diameters from 1.2 to 160 centimeters (cm). The sealed-seam wall pipe may have an outer diameter up to about 3 meters.

The pipe may optionally contain zero, one or more pipe additives. The "pipe additive" is a compound or material other than a polyolefin polymer that imparts one or more properties to, and/or enhances one or more properties of, the pipe. Examples of pipe additives are antimicrobial agents, antioxidants, catalyst neutralizers (of single site catalysts), colorants, and light stabilizers. The pipe additive(s), when present, may be pre-mixed with the bimodal ethylene-co-1-hexene copolymer composition prior to the melting step in the method of making the pipe. Alternatively, the pipe additive(s) may be added to the melt of the bimodal ethylene-co-1-hexene copolymer composition during or after the melting step and prior to the extruding step in the method of making the pipe. When two or more pipe additives are used, one or more pipe additives may be pre-mixed with the bimodal ethylene-co-1-hexene copolymer composition prior to the melting step in the method of making the pipe and a one or more pipe additives may be added to the melt of the bimodal ethylene-co-1-hexene copolymer composition during or after the melting step and prior to the extruding step in the method of making the pipe. In some aspects the pipe consists essentially of the bimodal ethylene-co-1-hexene copolymer composition, at least one antioxidant, and at least one catalyst neutralizer.

The pipe is useful for transporting fluids. Examples of such fluids are natural gas, crude oil, refined petroleum products, ethylene, alpha-olefins, water (cold or hot), aqueous mixtures of solutes. The pipe may be used in housing, infrastructure, construction, manufacturing plant constructions, and hydrocarbon-transporting pipelines.

The pipe may be characterized as having the properties required to meet ISO requirements for PE100 and/or PE100 RC pipe applications. The "RC" in PE100 RC means resistant to cracking. ISO requirements for PE100 pipe applications are specified in ISO 4427 for water pipe and ISO 4437 for gas pipe applications. The requirements for PE100 RC pipe applications are specified in PAS1075.

Alternatively precedes a distinct embodiment. ASTM means the standards organization, ASTM International, West Conshohocken, Pennsylvania, USA. Any comparative example is used for illustration purposes only and shall not be prior art. Free of or lacks means a complete absence of; alternatively not detectable. ISO is International Organization for Standardization, Chemin de Blandonnet 8, CP 401-1214 Vernier, Geneva, Switzerland. IUPAC is International Union of Pure and Applied Chemistry (IUPAC Secretariat, Research Triangle Park, North Carolina, USA). May confers a permitted choice, not an imperative. Operative means functionally capable or effective. Optional(ly) means is absent (or excluded), alternatively is present (or included). PAS is Publically Available Specification, Deutsches Institut für Normunng e.V. (DIN, German Institute for Standardization) Properties may be measured using standard test methods and conditions. Ranges include endpoints, subranges, and whole and/or fractional values subsumed therein, except a range of integers does not include fractional values. Room temperature: 23° C.±1° C.

EXAMPLES

Accelerated Full-Notch Creep Test (FNCT) Method: measured according to ISO 16770:2004 at 90° C., determined at an actual stress of 5.0 MPa in 2 wt % lauramine oxide in water. ISO 16770:2004 (last reviewed and confirmed in 2014), *Plastics—Determination of environmental stress cracking (ESC) of polyethylene—Full-notch creep test (FNCT).* The 2 wt % lauramine oxide in water may be made by diluting with water Dehyton PL, which is an aqueous solution of 25.0 to 50.0 wt % of lauramine oxide and is sold by BASF.

Bimodality Test Method: determine presence or absence of resolved bimodality by plotting dWf/dLog M (mass detector response) on y-axis versus Log M on the x-axis to obtain a GPC chromatogram curve containing local maxima log(MW) values for LMW and HMW polyethylene component peaks, and observing the presence or absence of a local minimum between the LMW and HMW polyethylene component peaks. The dWf is change in weight fraction, dLog M is also referred to as dLog (MW) and is change in logarithm of molecular weight, and Log M is also referred to as Log(MW) and is logarithm of molecular weight.

Butyl Branch Frequency (BBF) Test Method: Comonomer content is determined using $^{13}$C NMR analysis in accordance with techniques described, for example, in U.S. Pat. No. 5,292,845 (Kawasaki, et al.) and by J. C. Randall in Rev. Macromol. Chem. Phys., C29, 201-317, ranging from homopolymer zero short chain branches per 1,000 total carbon atoms (0 SCB/1000 total C) to 50 SCB/1000 total C, where total C is the sum of the carbons in polymer backbone plus the carbons in all polymer branches. In poly(ethylene-co-1-hexene) copolymer, most or all branches are butyl groups (e.g., —(CH$_2$)$_3$CH$_3$) and the butyl branch frequency (BBF) equals the number of butyl branches per 1000 total C.

Deconvoluting Test Method: segment the chromatogram obtained using the Bimodality Test Method into nine (9) Schulz-Flory molecular weight distributions. Such deconvolution method is described in U.S. Pat. No. 6,534,604. Assign the lowest four MW distributions to the LMW polyethylene component and the five highest MW distributions to the HMW polyethylene component. Determine the respective weight percents (wt %) for each of the LMW and HMW polyethylene components in the bimodal ethylene-co-1-hexene copolymer composition by using summed values of the weight fractions (Wf) of the LMW and HMW polyethylene components and the respective number average molecular weights (M$_n$) and weight average molecular weights (M$_w$) by known mathematical treatment of aggregated Schulz-Flory MW distributions.

Density is measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

Gel permeation chromatography (GPC) Test Method: Weight-Average Molecular Weight Test Method: determine M$_w$, number-average molecular weight (M$_n$), and M$_w$/M$_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (μL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate M$_w$ and M$_n$ using universal calibration relationships with the column calibrations. Calculate MW at each elution volume with following equation:

$$\log M_X = \frac{\log(K_X/K_{PS})}{a_X+1} + \frac{a_{PS}+1}{a_X+1}\log M_{PS},$$

where subscript "X" stands for the test sample, subscript "PS" stands for PS standards, a$_{PS}$=0.67, K$_{PS}$=0.000175, and a$_X$ and K$_X$ are obtained from published literature. For polyethylenes, a$_X$/K$_X$=0.695/0.000579. For polypropylenes a$_X$/K$_X$=0.705/0.0002288. At each point in the resulting chromatogram, calculate concentration, c, from a baseline-subtracted DRI signal, I$_{DRI}$, using the following equation: c=K$_{DRI}$I$_{DRI}$/(dn/dc), wherein K$_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/dLog (MW) on the y-axis versus Log(MW) on the x-axis to give a GPC chromatogram, wherein Log(MW) and dW/dLog (MW) are as defined above.

High Load Melt Index (HLMI) I$_{21}$ Test Method: use ASTM D1238-13, *Standard Test Method for Melt Flow Rates of Thermoplastics by Extrusion Platometer*, using conditions of 190° C./21.6 kilograms (kg). Report results in units of grams eluted per 10 minutes (g/10 min.).

Melt Index ("I$_2$") Test Method: for ethylene-based (co) polymer is measured according to ASTM D1238-13, using conditions of 190° C./2.16 kg, formerly known as "Condition E".

Melt Index I$_5$ ("I$_5$") Test Method: use ASTM D1238-13, using conditions of 190° C./5.0 kg. Report results in units of grams eluted per 10 minutes (g/10 min.).

Melt Flow Ratio MFR5: ("I$_{21}$/I$_5$") Test Method: calculated by dividing the value from the HLMI I$_{21}$ Test Method by the value from the Melt Index I$_5$ Test Method.

Melt Strength Test Method: using a Göttfert Rheotens tester, at a test temperature of 190° C. The test uses a die having a length of 30 mm and an inner diameter of 2 mm. Acceleration is 2.4 millimeters per second per second (mm/s$^2$). Peak melt strength value is the highest value observed in a velocity range from 10 to 50 mm/s). Average melt strength is a mean of melt strength values measured in a velocity range from 35 to 50 mm/s. The strain hardening modulus is measured according to ISO 18488:2015, *Polyethylene (PE) materials for piping systems—Determination of Strain Hardening Modulus in relation to slow crack growth—Test Method*.

Shear Thinning Index (SHI) Test Method: Use dynamic mechanical spectroscopy (DMS). Compression mold a test sample with a Carver Press into a 25×3 mm circular plaque at 190° C. for 6.5 minutes under 9,070 kg in air. Remove the plaque from the press, and place it on a countertop to cool. Using the plaque, perform a constant temperature frequency sweep using either classic ARES or ARES-G2 strain controlled rheometer equipped with 25 mm (diameter) parallel plates under a nitrogen purge. Place the plaque on the plate, and allow it to melt for 5 minutes at 190° C. Close the plates to a gap of 2 mm, trim off the plaque portion that extends beyond the circumference of plates, and start the constant temperature frequency sweep with a 5 minute delay to allow for temperature equilibrium. Perform runs at 190° C. over a frequency range of from 0.01 radian per second (rad/s) to 100 rad/s at 5 points per decade of range. Keep strain amplitude constant at 10%. The rheometer applies a shear deformation in the form of strain to the plaque and measures the response torque. Report results as complex viscosity η*, tan (δ) or tan delta, viscosity, G', G", and G*. Calculate the shear thinning index (abbreviated "SHI (0.01/100)" or "η$_{0.01/100}$" or "η$_{0.01}$/η$_{100}$") equal to the complex viscosity at 0.01 rad/s divided by the complex viscosity at 100 rad/s.

Antioxidant: 1. Pentaerythritol tetrakis(3-(3,5-di(1',1'-dimethylethyl)-4-hydroxyphenyl)propionate); obtained as IRGANOX 1010 from BASF.

Antioxidant 2. Tris(2,4-di(1',1'-dimethylethyl)-phenyl) phosphite. Obtained as IRGAFOS 168 from BASF.

Carbon Black Masterbatch 1: 40 wt % of P-type carbon black, having a particle size less than 10 nm, in a linear low density polyethylene carrier resin. Obtained as LL2590 from Cabot Corporation.

Catalyst Neutralizer: 1. Calcium stearate.

Bimodal Catalyst System 1 (BMC1): a spray-dried catalyst formulation prepared from Cabosil™ TS-610, methylalumoxane, bis(2-(pentamethylphenylamido)ethyl)-amine zirconium dibenzyl, and (methylcyclopentadienyl)(1,3-dimethyl-4,5,6,7-tetrahydroindenyl)zirconium dimethyl.

Bimodal Catalyst System 2 (BMC2): a spray-dried catalyst formulation prepared from Cabosil™ TS-610, methylalumoxane and bis(2-(pentamethylphenylamido)ethyl)-amine zirconium dibenzyl.

Bimodal Catalyst System 3 (BMC3): PRODIGY™ BMC-200 from Univation Technologies, LLC, Houston, Texas, USA.

Trim catalyst 1 (TC1): a solution of 0.04 wt % (methylcyclopentadienyl)(1,3-dimethyl-4,5,6,7-tetrahydroindenyl) zirconium dimethyl in isopentane.

Trim catalyst 2 (TC2): PRODIGY™ UT-TR-200 from Univation Technologies, LLC.

Comonomer: 1-hexene or $H_2C=C(H)(CH_2)_3CH_3$.

Ethylene ("$C_2$"): $CH_2=CH_2$.

Molecular hydrogen gas: $H_2$.

Inventive Example 1 (IE1): polymerization procedure. Runs in a semi-commercial scale reactor with the Bimodal Catalyst System 1 (BMC1), Trim Catalyst 1 (TC1), and comonomer 1-hexene according to the method described earlier adjusting polymerization conditions comprising reactor bed temperature, $H_2/C_2$ molar ratio, $C_6/C_2$ molar ratio, and TC1 feed rate to give an embodiment of the bimodal ethylene-co-1-hexene copolymer composition as granular resins. The polymerization operating conditions are reported in Table 1.

Inventive Example 2 (IE2): polymerization procedure. Runs in a pilot plant reactor used Bimodal Catalyst System 2 (BMC2), Trim Catalyst 1 (TC1), and comonomer 1-hexene according to the method described earlier adjusting polymerization conditions comprising reactor bed temperature, $H_2/C_2$ molar ratio, $C_6/C_2$ molar ratio and TC1 feed rate to give embodiments of the bimodal ethylene-co-1-hexene copolymer composition as granular resins. Polymerization operating conditions are reported in Table 1. IE2 is excluded as an inventive example in embodiments that include the melt property (c) shear thinning index from 96 to 125.

Control Example 1 (CE1): polymerization procedure for CE1: Runs in a semi-commercial scale reactor with the Bimodal Catalyst System 3 (BMC3), Trim Catalyst 2 (TC2), and comonomer 1-hexene according to the method described earlier adjusting polymerization conditions comprising reactor bed temperature, $H_2/C_2$ molar ratio, $C_6/C_2$ molar ratio and TC2 feed rate to give a comparative bimodal ethylene-co-1-hexene copolymer composition as granular resins. Table 1 reports polymerization operating conditions.

TABLE 1

Operating conditions for IE1 to IE2 and CE1.

| | IE1 | IE2 | CE1 |
|---|---|---|---|
| Reactor Type | S, CM, FB GPP* | S, CM, FB GPP** | S, CM, FB GPP |
| Reactor Purging gas | Anhydrous $N_2$ | Anhydrous $N_2$ | Anhydrous $N_2$ |
| Bed Temp. (° C.) | 99.9 | 105.0 | 104.9 |
| Rx Pressure (kpa)^ | 1827 | 2410 | 1827 |
| $C_2$ Partial Pressure (kpa) | 1517 | 1516 | 1517 |
| $H_2/C_2$ Molar Ratio | 0.00229 | 0.00280 | 0.00198 |
| $C_6/C_2$ Molar Ratio | 0.00560 | 0.00703 | 0.00446 |
| 1-methyl-butane (mol %) | 11.4 | 11.4 | 11.4 |
| Superficial Gas Velocity (m/sec) | 0.643 | 0.555 | 0.643 |
| Bimodal Catalyst System | BMC1 | BMC2 | BMC3 |
| Trim catalyst | TC1 | TC1 | TC2 |
| Starting seedbed = granular HDPE resin | Preloaded | Preloaded | Preloaded |
| Fluidized Bed Weight (kg) | 16,086 | 32.1 | 15,275 |
| Copolymer composition Production Rate (kg/hour) | 4,491 | 14.6 | 4,355 |
| Copolymer composition Residence Time (hour) | 3.58 | 2.2 | 3.51 |
| Copolymer composition Fluid Bulk Density, (kg/m³) | 293 | 178 | 279 |

*S, CM, FB, GPP: single, continuous mode, fluidized bed gas phase polymerization.
**pilot plant reactor did not operate in condensing mode.
^Rx Pressure (kPa): reactor total pressure in kilopascals.

As shown in Table 1, the operating conditions used to make the bimodal ethylene-co-1-hexene copolymer compositions of IE1 to IE2 comprise the bimodal catalyst system, trim catalyst, a bed temperature of 99.9° to 105.0° C.; an ethylene ($O_2$) partial pressure of 1516 to 1517 kpa; an $H_2/O_2$ Molar Ratio from 0.00229 to 0.00280; and a $C_6/O_2$ Molar Ratio from 0.00560 to 0.00703; a superficial gas velocity from 0.555 to 0.643 m/sec (meter per second). In certain embodiments, the method of synthesizing the bimodal ethylene-co-1-hexene copolymer composition employ the aforementioned operating conditions.

Formulation and Pelletization Procedure: Each of the different granular resins of IE1 to IE2 and CE1 was separately mixed with 1,500 parts per million weight/weight (ppm) of Antioxidant 1, 500 ppm Antioxidant 2, and 1,000 ppm Catalyst Neutralizer 1, and 5.6 wt % of Carbon black masterbatch 1 (to give a final formulation having 2.25 wt % carbon black) in a ribbon blender, and then compounded into strand cut pellets using a twin-screw extruder Coperion ZSK-40. The resulting pellets of each resin were tested for melt properties of HLMI ($I_{21}$), MFI (5 kg), MFR5 ($I_{21}/I_5$), and melt strength according to their aforementioned respective test methods. Results are reported below in Table 2. In certain embodiments, the bimodal ethylene-co-1-hexene copolymer composition further comprises at least one antioxidant selected from Antioxidants 1 and 2; at least one catalyst neutralizer selected from Catalyst Neutralizers 1 and 2; or a combination thereof.

TABLE 2

Melt properties of IE1 to IE2 and CE1.

| Test | IE1 | IE2 | CE1 |
|---|---|---|---|
| $\eta_{0.01}/\eta_{100}$ | 107 | 74 | 119 |
| $I_{21}$ (190° C., 21.6 kg) (g/10 min.) | 5.41 | 5.72 | 5.75 |
| $I_5$ (190° C., 5.0 kg) (g/10 min.) | 0.183 | 0.21 | 0.179 |
| MFR5 ($I_{21}/I_5$) | 29.5 | 27.0 | 32.2 |
| melt strength (cN) | ca. 20.0 | 19.6 | ca. 20.5 |

As shown in Table 2, the melt properties of the bimodal ethylene-co-1-hexene copolymer compositions of IE1 to IE2 comprise a high-load melt index $I_{21}$ (190° C., 21.6 kg) from 5.41 to 5.72 g/10 min.; a melt flow index $I_5$ (190° C., 5.0 kg) from 0.183 to 0.21 g/10 min.; a melt flow ratio MFR5 ($I_{21}/I_5$) from 27.0 to 29.5; and a melt strength from 19 to 21 cN (19.6 to 20.0 cN). In certain embodiments, the bimodal ethylene-co-1-hexene copolymer composition is characterized by any one, alternatively all but one, alternatively each of the melt properties.

Granular resins of IE1 to IE2 and CE2 were characterized by density; butyl branch frequency per 1000 carbon atoms (bbf/1000C); molecular mass dispersity ($M_w/M_n$), $Đ_M$, and weight-, number-, and z-average molecular weight according to their aforementioned respective test methods. Results are reported below in Table 3.

TABLE 3

Resin properties of IE1 to IE2 and CE1.

| Test | IE1 | IE2 | CE1 |
|---|---|---|---|
| Density (g/cm³) | 0.9486 | 0.9484 | 0.9488 |
| HMW Component Split (wt %) | 36.9 | 49.1 | 42.3 |
| LMW Component Split (wt %) | 63.1 | 50.9 | 57.7 |
| HMW Mn (kg/mol) | 200.3 | 151.0 | 187.3 |
| HMW Mw (kg/mol) | 812.4 | 656.1 | 714.5 |
| HMW Mw/Mn | 4.05 | 4.34 | 3.82 |
| LMW Mn (kg/mol) | 12.5 | 9.6 | 12.2 |
| LMW Mw (kg/mol) | 35.4 | 27.8 | 33.4 |
| LMW Mw/Mn | 2.84 | 2.88 | 2.74 |
| bbf/1000C | 1.4 | 1.43 | 1.28 |
| $M_n$ (kg/mol) | 23.1 | 14.9 | 21.2 |
| $M_w$ (kg/mol) | 354.1 | 333.3 | 324.5 |
| $M_w/M_n$ ($Đ_M$) | 15.3 | 22.4 | 15.3 |
| $M_z$ (kg/mol) | 3,086 | 2,462 | 2,402 |
| BBF (per 1000C) | 1.4 | 1.43 | 1.28 |

As shown in Table 3, the resin properties of the bimodal ethylene-co-1-hexene copolymer compositions of IE1 to IE2 comprise a density of 0.9486 to 0.9584 g/cm³; a high molecular weight (HMW) component split from 36.9 to 49.1 wt %; a low molecular weight (LMW) component split from 63.1 to 50.9 wt %, respectively; a number-average molecular weight from 14,900 to 23,100 g/mol; a weight-average molecular weight from 333,300 to 354,100 g/mol; a molecular mass dispersity $M_w/M_n$ ($Đ_M$) from 15.3 to 22.4; a z-average molecular weight from 2,462,000 to 3,086,000 g/mol; and a butyl branch frequency from 1.4 to 1.43 per 1,000 carbon atoms. In certain embodiments, the bimodal ethylene-co-1-hexene copolymer composition is characterized by any one, alternatively all but one, alternatively each of the resin properties.

Pipe Forming Procedure: Pellets of granular resins of the bimodal ethylene-co-1-hexene copolymer composition of IE1 to IE2 and CE1 are separately melted at melt temperature described herein, and separately and extruded into 25.4 centimeter (cm, 10 inch) SDR11 pipes using a Davis Standard 130 mm grooved-barrel pipe extrusion machine. Evaluated the SDR11 pipes for resistance to rapid crack propagation critical pressure (ISO 13477). Measured slow crack growth resistance by the strain hardening modulus and accelerated FNCT. See Table 4.

TABLE 4

Pipe properties of IE1 to IE2 and CE1.

| Test | IE1 | IE2 | CE1 |
|---|---|---|---|
| Extruder speed (rpm) | 75.7 | N/t | 75.7 |
| Motor load (%) | 78 | N/t | 79 |
| Rate (kg/hour) | 0.891 | N/t | 0.816 |
| Head Pressure (MPa) | 33 | N/T | 36 |
| RCP Pc ISO13477 (MPa) | >1 | N/t | >1 |
| Strain hardening modulus (MPa) | 61 | N/t | 58 |
| Accelerated FNCT (hours) | 473 | 531 | 249 |

N/t means not tested.

As shown in Table 4, the pipe properties of the bimodal ethylene-co-1-hexene copolymer compositions of IE1 to IE2 comprise a strain hardening modulus from and an accelerated full-notch creep test performance from 473 to 531 hours. In certain embodiments, the bimodal ethylene-co-1-hexene copolymer composition, and the pipe thereof, are independently characterized by any one, alternatively all but one, alternatively each of the aforementioned pipe properties. Without wishing to be bound by theory, it is believed that the bimodal ethylene-co-1-hexene copolymer composition at a given density has enhanced performance in accelerated FNCT because of its combination of Mw/Mn and comonomer distribution properties. For example, the bimodal ethylene-co-1-hexene copolymer composition has higher amount of comonomeric unit content in the HMW component at a given composition density than comparative bimodal ethylene/1-hexene copolymers. This enhancement means that the bimodal ethylene-co-1-hexene copolymer composition is enhanced for use as a resin for making PE100 pipe and PE100 RC pipe.

The invention claimed is:

1. A bimodal ethylene-co-1-hexene copolymer composition having a density from 0.945 to 0.960 gram per cubic centimeter (g/cm³), measured according to ASTM D792-13, Method B;
   a molecular mass dispersity ($M_w/M_n$), $Đ_M$, from 11.0 to 25.0, wherein $M_w$ and $M_n$ are measured according to the Gel Permeation Chromatography (GPC) Test Method; and consisting essentially of
   a higher molecular weight ethylene-co-1-hexene copolymer component (HMW component), having a molecular weight distribution (Mw/Mn) greater than 3.75 (>3.75), and a lower molecular weight polyethylene homopolymer or a lower molecular weight ethylene-co-1-hexene copolymer component (LMW component), wherein the LMW component has a molecular weight distribution (Mw/Mn) from 2.75 to 3.35; and having a component fraction split characterized by a weight fraction of the HMW component from 35.0 to 65.0 wt % and a weight fraction of the LMW component from 65.0 to 35.0 wt %, respectively, of the combined weight of the HMW and LMW components, measured according to the GPC Test Method; and wherein when in melted form at 190° C., the bimodal ethylene-co-1-hexene copolymer composition is characterized by properties (a), (b), and optionally (c):

(a) a melt flow index(5 kg) ($I_5$ or $MFI_5$) from 0.15 to 0.30 gram per 10 minutes (g/10 min.),0

(b) peak melt strength from 18 to 29 centiNewtons (CN), and, optionally, (c) shear thinning index, $\eta_{0.01}/\eta_{100}$, from 96 to 125;

and when in solid form the bimodal ethylene-co-1-hexene copolymer composition is characterized by properties (d) and (e):

(d) strain hardening modulus from 50.0 to 75 megapascals (MPa) and (e) accelerated full-notch creep test (FNCT) performance from 401 to 700.0 hours; wherein the melt flow index (5 kg) is measured according to ASTM D1238-13 (190° C., 5.0 kg), the shear thinning index is measured according to Shear Thinning Index Test Method (190° C.), the peak melt strength is measured at the highest peak in a plot of melt strength versus a range of velocity from 10 to 50 millimeters per second (mm/s) according to Melt Strength Test Method, the strain hardening modulus is measured according to ISO 18488:2015, and the accelerated FNCT performance is measured according to ISO 16770:2004 at 90° C. and under an actual stress of 5.0 MPa in 2 weight percent (wt %) lauramine oxide in water.

2. The bimodal ethylene-co-1-hexene copolymer composition of claim 1 characterized by any one of property limitations (i) to (viii): (i) the density is from 0.9450 to 0.9590 g/cm³; (ii) the component fraction split is characterized by a weight fraction of the HMW component from 44.0 to 52.0 wt %; and a weight fraction of the LMW component from 56.0 to 48.0 wt %, respectively, of the combined weight of the HMW and LMW components; (iii) the molecular mass dispersity ($M_w/M_n$), $Ð_M$, is from 11.0 to 23.0; (iv) the (a) $MFI_5$ is from 0.15 to 0.24 g/10 min.; (v) the (c) shear thinning index, $\eta_{0.01}/\eta_{100}$, is from 99 to 115; (vi) the (b) peak melt strength is from 20.0 to 28 cN; (vii) the (d) strain hardening modulus is from 55 to 70.0 MPa;

and (viii) the (e) accelerated FNCT performance is from 401 to 600.0 hours.

3. The bimodal ethylene-co-1-hexene copolymer composition of claim 1 further characterized by any one of melt property limitations (i) to (iii): (i) a high load melt index from 1 to 10 g/10 min., measured according to ASTM D1238-13 (190° C., 21.6 kg, HLMI or $I_{21}$); (ii) a melt flow ratio $I_{21}/I_5$ ("MFR5") from 20 to 40, wherein the $I_{21}$ and $I_5$ values used to calculate the MFR5 are each in g/10 min. and are measured according to ASTM D1238-13 (190° C., 21.6 kg, "$I_{21}$"; and 190° C., 5.0 kg, "$I_5$", respectively); (iii) both (i) and (ii).

4. The bimodal ethylene-co-1-hexene copolymer composition of claim 1 further characterized by any one of resin property limitations (i) to (iv): (i) a weight-average molecular weight ($M_w$) from 300,000 to 400,000 grams per mole (g/mol); (ii) a number-average molecular weight ($M_n$) from 10,000 to 30,000 grams g/mol; (iii) a z-average molecular weight ($M_z$) from 2,000,000 to 3,400,000 g/mol; (iv) a butyl branch frequency per 1,000 carbon atoms (bbf/1000C) from 1.2 to 1.5, as measured according to the Butyl Branch Frequency Test Method; and wherein $M_w$, $M_n$ and $M_z$ are measured according to the GPC Test Method.

5. A pipe consisting essentially of the bimodal ethylene-co-1-hexene copolymer composition of claim 1.

6. A manufactured article comprising the bimodal ethylene-co-1-hexene copolymer composition of claim 1, wherein the manufactured article is not a pipe.

7. A method of synthesizing the bimodal ethylene-co-1-hexene copolymer composition of claim 1, the method comprising copolymerizing ethylene and 1-hexene, and copolymerizing fresh ethylene and, optionally, fresh 1-hexene, with a combination of a bimodal catalyst system and a trim catalyst in the presence of molecular hydrogen gas and, optionally, an induced condensing agent in one polymerization reactor under effective polymerizing conditions to give an initial bimodal ethylene-co-1-hexene copolymer composition; wherein the bimodal catalyst system is made by contacting a first activator with bis(2-(pentamethylphenylamido)ethyl)-amine zirconium dibenzyl and a (methylcyclopentadienyl)(1,3-dimethyl-4,5,6,7-tetrahydroindenyl) zirconium dimethyl; wherein the trim catalyst is made by contacting a second activator with (methylcyclopentadienyl) (1,3-dimethyl-4,5,6,7-tetrahydroindenyl)zirconium dimethyl; wherein the first and second activators are the same or different; and wherein the effective polymerizing conditions comprise a reaction temperature from 90 degrees)(° to 110° Celsius (C.); a molar ratio of the molecular hydrogen gas to the ethylene from 0.001 to 0.0050; and a molar ratio of the 1-hexene to the ethylene from 0.00450 to 0.01000.

8. The method of claim 7 further comprising removing the bimodal ethylene-co-1-hexene copolymer composition from the reactor to give a removed bimodal ethylene-co-1-hexene copolymer composition.

9. A method of making a pipe, the method comprising steps (A), (B1) or (B2), optionally (C), and (D): (A) melting the bimodal ethylene-co-1-hexene copolymer composition of claim 1 to give a melt thereof; (B1) extruding the melt through an annular die configured for forming a cylinder so as to make an initial solid wall cylinder of the bimodal ethylene-co-1-hexene copolymer composition or (B2) extruding and spirally winding the melt around a mandrel configured for forming an unsealed-seam profile wall so as to make an unsealed-seam profile wall, and heat-fusing the unsealed seam of the unsealed-seam profile wall to make an initial sealed-seam wall cylinder; (C) optionally resizing the initial solid wall cylinder or the initial sealed-seam wall cylinder to make a resized wall cylinder having a different diameter; and (D) cooling the initial solid wall cylinder, the initial sealed-seam wall cylinder, or the resized wall cylinder, thereby making a solid wall pipe or a seam-sealed wall pipe, respectively.

* * * * *